US012609046B1

(12) United States Patent
Ghosh et al.

(10) Patent No.: US 12,609,046 B1
(45) Date of Patent: Apr. 21, 2026

(54) SYSTEMS AND METHODS FOR CONTROLLED LANGUAGE GENERATION FOR LANGUAGE LEARNING ITEMS

(71) Applicant: Educational Testing Service, Princeton, NJ (US)

(72) Inventors: Debanjan Ghosh, Arlington, MA (US); Kevin Stowe, Princeton, NJ (US); Mengxuan Zhao, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 231 days.

(21) Appl. No.: 18/359,143

(22) Filed: Jul. 26, 2023

Related U.S. Application Data

(60) Provisional application No. 63/394,006, filed on Aug. 1, 2022.

(51) Int. Cl.
| | |
|---|---|
| G09B 19/06 | (2006.01) |
| G06F 40/30 | (2020.01) |
| G06F 40/56 | (2020.01) |
| G09B 5/06 | (2006.01) |

(52) U.S. Cl.
CPC ............. G09B 19/06 (2013.01); G06F 40/30 (2020.01); G06F 40/56 (2020.01); G09B 5/06 (2013.01)

(58) Field of Classification Search
CPC ........... G09B 5/06; G09B 19/06; G06F 40/30; G06F 40/56
USPC ....................................................... 704/9, 10
See application file for complete search history.

(56) References Cited

U.S. PATENT DOCUMENTS

| | | | | |
|---|---|---|---|---|
| 11,023,684 B1* | 6/2021 | Flor | ...................... | G06F 40/253 |
| 11,494,560 B1* | 11/2022 | Meisner | ................ | G06N 20/00 |
| 2003/0040902 A1* | 2/2003 | Wen | ....................... | G06F 40/289 |
| | | | | 704/4 |
| 2008/0319735 A1* | 12/2008 | Kambhatla | ............. | G06F 40/30 |
| | | | | 704/9 |
| 2018/0182255 A1* | 6/2018 | Chen | ...................... | G09B 5/065 |
| 2018/0276718 A1* | 9/2018 | Thomas | ................ | G06F 40/237 |
| 2018/0293302 A1* | 10/2018 | Ko | ......................... | G06F 40/295 |
| 2022/0156177 A1* | 5/2022 | Levacher | ............. | G06F 11/3692 |
| 2022/0269863 A1* | 8/2022 | Araki | ..................... | G06F 40/169 |
| 2022/0385703 A1* | 12/2022 | Joshi | ...................... | H04L 51/02 |
| 2023/0080674 A1* | 3/2023 | Attali | ..................... | G06F 40/56 |
| 2023/0087611 A1* | 3/2023 | Busbridge | ............. | G10L 15/063 |
| 2023/0142574 A1* | 5/2023 | Blau-Mccandliss | ... | G09B 19/04 |
| | | | | 704/9 |

(Continued)

OTHER PUBLICATIONS

Becker, Maria, et al.; COCO-EX: A Tool for Linking Concepts from Texts to ConceptNet; Proceedings of the 16th Conference of the European Chapter of the Association for Computational Linguistics, pp. 119-126; Apr. 2021.

(Continued)

*Primary Examiner* — James S Wozniak
(74) *Attorney, Agent, or Firm* — Jones Day

(57) ABSTRACT

Systems and methods are provided for generating language learning items. In embodiments, training data comprising a plurality of concept-sentence pairs received by a machine-learning based language model may be used to train the model to generate sentences based on an input. A stimulus may be received and used by the trained machine-learning based language model to generate a sentence. The sentence may be stored in a computer readable medium.

18 Claims, 16 Drawing Sheets

(56)                    References Cited

U.S. PATENT DOCUMENTS

| | | | | |
|---|---|---|---|---|
| 2023/0162613 | A1* | 5/2023 | Asgekar | G09B 7/00 |
| | | | | 434/350 |
| 2023/0274089 | A1* | 8/2023 | Tunstall-Pedoe | G06F 40/40 |
| | | | | 704/2 |
| 2023/0368015 | A1* | 11/2023 | Wick | G06N 3/084 |

OTHER PUBLICATIONS

Brown, Tom, et al.; Language Models are Few-Shot Learners; arXiv:2005.14165; 2020.

Carlsson, Fredrik, et al.; Fine-Grained Controllable Text Generation Using Non-Residual Prompting; Proceedings of the 60th Annual Meeting of the Association for Computational Linguistics, vol. 1: Long Papers; Dublin, Ireland; pp. 6837-6857; May 2022.

Clarke, John, Miles, Sherri; Changing Systems to Personalize Learning: Introduction to the Personalization Workshops; 2003.

Educational Testing Service; TOEFL iBT Test Framework and Test Development; TOEFL Research Insight, vol. 1; 2010.

Fan, Angela, Grangier, David, Auli, Michael; Controllable Abstractive Summarization; arXiv:1711.05217; 2017.

Ficler, Jessica, Goldberg, Yoav; Controlling Linguistic Style Aspects in Neural Language Generation; arXiv:1707.02633; 2017.

Gao, Lingyu, et al.; "What Makes a Question Inquisitive?": A Study on Type-Controlled Inquisitive Question Generation; Proceedings of the 11th Joint Conference on Lexical and Computational Semantics; Seattle, WA; pp. 240-257; Jul. 2022.

Gururangan, Suchin, Marasovic, Ana, Swayamdipta, Swabha, Lo, Kyle, Beltagy, Iz, Downey, Doug, Smith, Noah; Don't Stop Pretraining: Adapt Language Models to Domains and Tasks; Proceedings of the 58th Annual Meeting of the Association for Computational Linguistics; pp. 8342-8360; Jul. 2020.

Hu, Zhiting, et al.; Toward Controlled Generation of Text; International Conference on Machine Learning; pp. 1587-1596; 2017.

Keskar, Nitish Shirish, et al.; CTRL: A Conditional Transformer Language Model for Controllable Generation; arXiv:1909.05858; 2019.

Kikuchi, Yuta, et al.; Controlling Output Length in Neural Encoder-Decoder; arXiv:1609.09552; 2016.

Krause, Ben, et al.; GeDi: Generative Discriminator Guided Sequence Generation; Findings of the Association for Computational Linguistics: EMNLP 2021; pp. 4929-4952; Nov. 2021.

Lewis, Mike, et al.; BART: Denoising Sequence-to-Sequence Pretraining for Natural Language Generation, Translation, and Comprehension; Proceedings of the 58th Annual Meeting of the Association for Computational Linguistics; pp. 7871-7880; Jul. 2020.

Lin, Bill Yuchen, et al.; CommonGen: A Constrained Text Generation Challenge for Generative Commonsense Reasoning; Findings of the Association for Computational Linguistics: EMNLP 2020; pp. 1823-1840; Nov. 2020.

Lin, Chin-Yew; ROUGE: A Package for Automatic Evaluation of Summaries; Text Summarization Branches Out, Association for Computational Linguistics; Barcelona, Spain; pp. 74-81; Jul. 2004.

Montgomerie, Adam; CEFR English Level Predictor; 2022.

Morgan, Hani; Maximizing Student Success with Differentiated Learning; The Clearing House: A Journal of Educational Strategies, Issues and Ideas, 87(1); pp. 34-38; Jan.-Feb. 2014.

Mostafazadeh, Nasrin, Chambers, Nathanael, He, Xiadong, Parikh, Devi, Batra, Dhruv, Kohli, Pushmeet, Vanderwende, Lucy, Allen, James; A Corpus and Cloze Evaluation for Deeper Understanding of Commonsense Stories; Proceedings of the 2016 Conference of the North American Chapter of the Association for Computational Linguistics: Human Language Technologies; San Diego, CA; pp. 839-849; Jun. 2016.

Papineni, Kishore, Roukos, Salim, Ward, Todd, Zhu, Wei-Jing; Bleu: A Method for Automatic Evaluation of Machine Translation; Proceedings of the 40th Annual Meeting of the Association for Computational Linguistics; pp. 311-318; Jul. 2002.

Radford, Alec, et al.; Language Models are Unsupervised Multitask Learners; 2019.

Raffel, Colin, et al.; Exploring the Limits of Transfer Learning with a Unified Text-to-Text Transformer; Journal of Machine Learning Research, 21; pp. 1-67; 2020.

Reiter, Ehud; A Structured Review of the Validity of BLEU; Computational Linguistics, 44(3); pp. 393-401; Sep. 2018.

Reiter, Ehud and Belz, Anja; An Investigation into the Validity of Some Metrics for Automatically Evaluating Natural Language Generation Systems; Computational Linguistics, 35(4); pp. 529-558; Dec. 2009.

Roller, Stephen, et al.; Recipes for Building an Open-Domain Chatbot; Proceedings of the 16th Conference of the European Chapter of the Association for Computational Linguistics, Main Volume; pp. 300-325; Apr. 2021.

Schiller, Benjamin, et al.; Aspect-Controlled Neural Argument Generation; Proceedings of the 2021 Conference of the North American Chapter of the Association for Computational Linguistics: Human Language Technologies; pp. 380-396; Jun. 2021.

Settles, Burr, et al.; Machine Learning-Driven Language Assessment; Transactions of the Association for Computational Linguistics, 8; pp. 247-263; 2020.

Speer, Robin, et al.; ConceptNet 5.5: An Open Multilingual Graph of General Knowledge; Proceedings of the 31st AAAI Conference on Artificial Intelligence; pp. 4444-4451; Feb. 2017.

Stanovsky, Gabriel, et al.; Supervised Open Information Extraction; Proceedings of the 2018 Conference of the North American Chapter of the Association for Computational Linguistics: Human Language Technologies, vol. 1 (Long Papers); New Orleans, LA; pp. 885-895; Jun. 2018.

Stowe, Kevin; et al.; Metaphor Generation with Conceptual Mappings; Proceedings of the 59th Annual Meeting of the Association for Computational Linguistics and the 11th International Joint Conference on Natural Language Processing; pp. 6724-6736; Aug. 2021.

Sutskever, Ilya, et al.; Sequence to Sequence Learning with Neural Networks; Advances in Neural Information Processing Systems (NIPS), 27; 2014.

Tsai, Alicia, et al.; Style Control for Schema-Guided Natural Language Generation; Proceedings of the 3rd Workshop on Natural Language Processing for Conversational AI; pp. 228-242; Nov. 2021.

Tu, Lifu, et al.; Generating Diverse Story Continuations with Controllable Semantics; Proceedings of the 3rd Workshop on Neural Generation and Translation (WNGT2019); Hong Kong, China; pp. 44-58; Nov. 2019.

Vaswani, Ashish, Shazeer, Noam, Parmar, Niki, Uszkoreit, Jakob, Jones, Llion, Gomez, Aidan, Kaiser, Lukasz, Polosukhi, Illia; Attention Is All You Need; 31st Conference on Neural Information Processing Systems; Long Beach, CA; pp. 5998-6008; 2017.

Wolf, Thomas, et al.; Transformers: State-of-th-Art Natural Language Processing; Proceedings of the 2020 Conference on Empirical Methods in Natural Language Processing: System Demonstrations; pp. 38-45; Oct. 2020.

Zhao, Chao, et al.; Revisiting Generative Commonsense Reasoning: A Pre-Ordering Approach; Findings of the Association for Computational Linguistics: NAACL 2022; pp. 1709-1718; Jul. 2022.

Zhou, Wangchunshu, et al.; Pre-Training Text-to-Text Transformers for Concept-centric Common Sense; arXiv:2011.07956; 2020.

* cited by examiner

| Model | Perplexity | Coverage (All) | Coverage (Any) | Length | Diversity |
|---|---|---|---|---|---|
| BASE | 4.51 | 50.55 | 93.34 | 12.13 | 43.34 |
| SRL | 4.53 | 51.40 | 94.10 | 11.98 | 43.51 |
| CEFR (A1) | 4.52 | 49.16 | 92.70 | 11.58 | 43.95 |
| CEFR (C2) | 4.41 | 39.70 | 74.61 | 15.26 | 37.31 |
| WIKI | 4.58 | 51.51 | 94.10 | 12.28 | 42.88 |

*Fig. 11*

| Model | V | ARG0 | ARG1 | ARGM |
|-------|-------|-------|-------|-------|
| BASE | 88.18 | 70.48 | 73.34 | 58.67 |
| SRL | 94.06 | 88.93 | 88.01 | 77.60 |

*Fig. 12*

| Model | Gram | Comp | Plaus |
|---|---|---|---|
| BASE | 2.450 | 1.502 | 2.602 |
| SRL | 2.472 | 1.350 | 2.595 |
| CEFR (A1) | 2.471 | 1.447 | 2.561 |
| CEFR (C2) | 2.360 | 1.728 | 2.593 |
| WIKI | 2.434 | 1.529 | 2.574 |

*Fig. 13*

SYSTEMS AND METHODS FOR CONTROLLED LANGUAGE GENERATION FOR LANGUAGE LEARNING ITEMS

CROSS-REFERENCE TO RELATED APPLICATIONS

This application claims the benefit of U.S. Provisional Patent Application No. 63/394,006, filed Aug. 1, 2022, which is incorporated by reference herein in its entirety.

TECHNICAL FIELD

The technology described herein relates to controlled language generation for language learning items.

BACKGROUND

Language learning items, such as multiple choice items for vocabulary tests, flashcards, and grammar lessons, have a variety of uses, such as use in language learning applications. Controlled language generation for language learning items can help create large amounts of fluent text in various languages to enable developers of language learning applications to be able to implement a much broader array of learning items with minimal manual effort.

SUMMARY

Systems and methods are provided for a computer-implemented method of generating language learning items. An example system performs steps, including receiving training data comprising a plurality of concept-sentence pairs and training a machine-learning based language model using the training data to generate sentences based on an input. The example system further receives a stimulus and generates a sentence based on the stimulus, using the trained machine-learning based language model. Then, the system stores the sentence in a computer readable medium.

As another example, a method of generating language learning items is presented. Training data comprising a plurality of concept-sentence pairs is received. A machine-learning based language model is trained, using the training data, to generate sentences based on an input. A stimulus is received, and a sentence based on the stimulus is generated, using the trained machine-learning based language model. The sentence is stored in a computer readable medium.

As a further example, a computer-readable medium is encoded with instructions for commanding one or more data processors to execute a method for generating language learning items. The example method includes receiving training data comprising a plurality of concept-sentence pairs. The example method further trains a machine-learning based language model, using the training data, to generate sentences based on an input. Then, the method performs additional steps, including receiving a stimulus and generating, using the trained machine-learning based language model, a sentence based on the stimulus, which is stored in a computer readable medium.

BRIEF DESCRIPTION OF THE DRAWINGS

FIG. 11 is a table depicting automatic evaluation of generation models.

FIG. 12 is a table depicting automatic evaluation of SRL coverage.

FIG. 13 is a table depicting human evaluation for each generation model.

DETAILED DESCRIPTION

Figure 1:
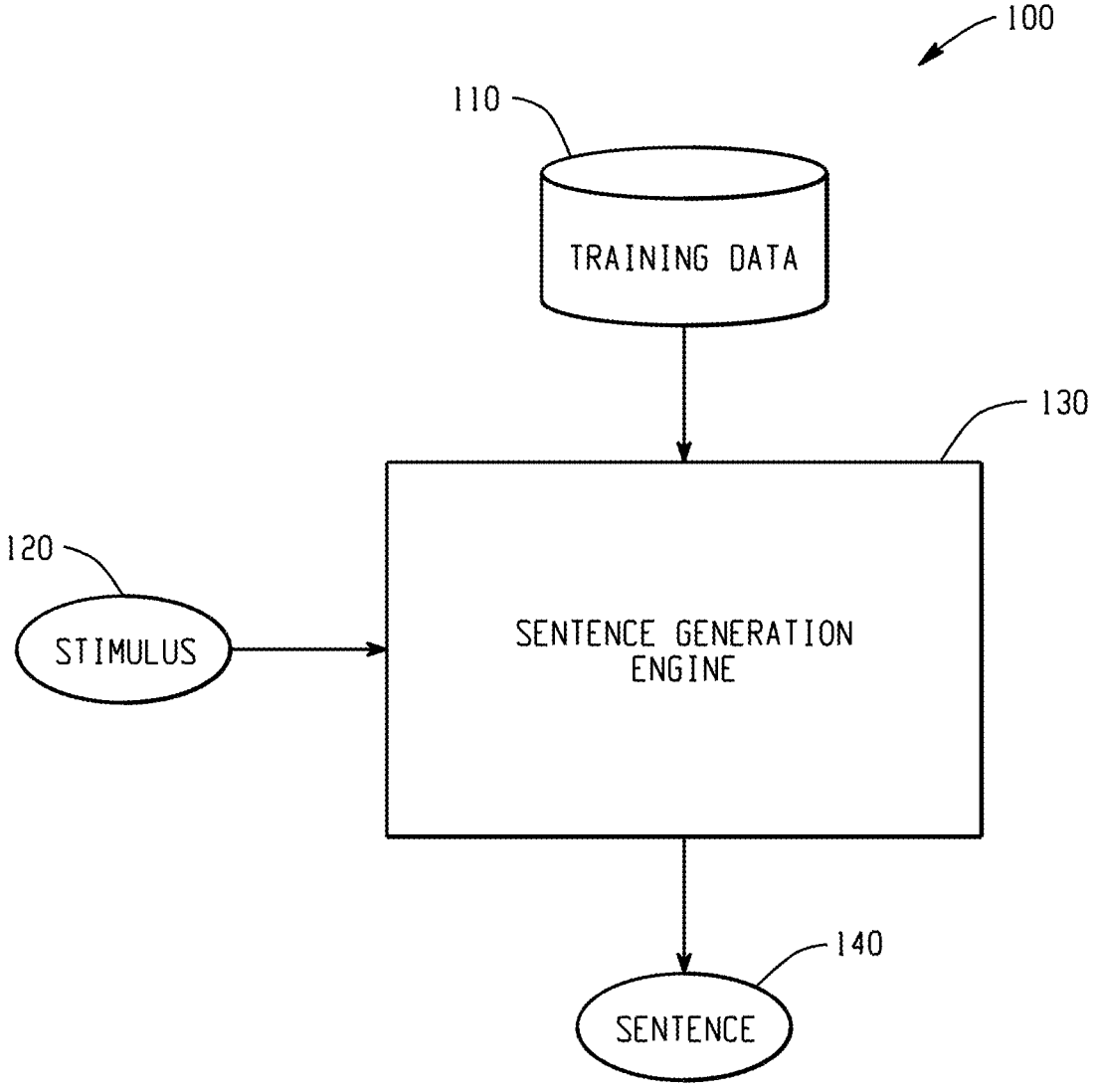
FIG. 1 is a diagram depicting an example system for generating language learning items.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Language learning applications (LLAs) are used by millions of people all over the world to learn new languages. LLAs often include language learning items, such as multiple choice items for vocabulary tests, flashcards, grammar lessons, etc., with sentence inputs. Typically, such items are created manually or curated from crowd-sourced sentence databases, such as Tatoeba. Language models may enable developers of LLAs to be able to implement a broader array of learning items with minimal additional manual effort.

Such models may also be configured to provide diverse content based on user needs and different skill sets. In one example, sentence generation is tailored to specific needs by conditioning sentences on Common European Framework for Reference for Languages (CEFR) levels in English, or an alternative language complexity scale in another language. Models can also be used to generate content for assessing a user's grammatical proficiency, as well as to provide additional syntactic and semantic information to concept inputs in the form of dependency parse and semantic role labels.

Systems and methods for controlled language generation for language learning items are described herein. Certain systems and methods herein generate language learning items or alternatively control the generation based on difficulty or argument structures. Difficulty-controlled language generation, as described in the systems and methods herein, may enable developers to tailor generation based on skill level. Argument-structure-controlled language generation, as described in the system and methods herein, may permit developers to test users' understandings of grammatical notions.

FIG. 1 is a diagram depicting a system embodiment 100 for generating language learning items. Language learning items may be any text-based content. A training data 110 and a stimulus 120 are received by a sentence generation engine 130 to generate a sentence 140. The training data 110 may include concept-sentence pairs acquired from a database, where each sentence is based on a concept. One example database that may be used is COMMONGEN, which is based on existing caption corpora, where many of the captions are phrases. Other example databases include ROCStories, the Google Book Corpus, and Totoeba sentence database. In some instances, sentences containing vocabulary items may be retrieved from these databases, where concepts are then extracted using a concept extraction tool, such as Concept-Net knowledge base. Other databases may also be utilized or created to train the language models.

The stimulus 120 received by the sentence generation engine 130 may contain one or more concepts that the sentence generation engine 130 uses to create the sentence 140. The sentence 140 may be one or more sentences based on the stimulus 120. This may be accomplished, in some instances, by using a framework, such as concept2seq, a sequence-to-sequence architecture in which a set of relevant concepts are used to generate sentences that minimally contain those concepts.

Figure 2:
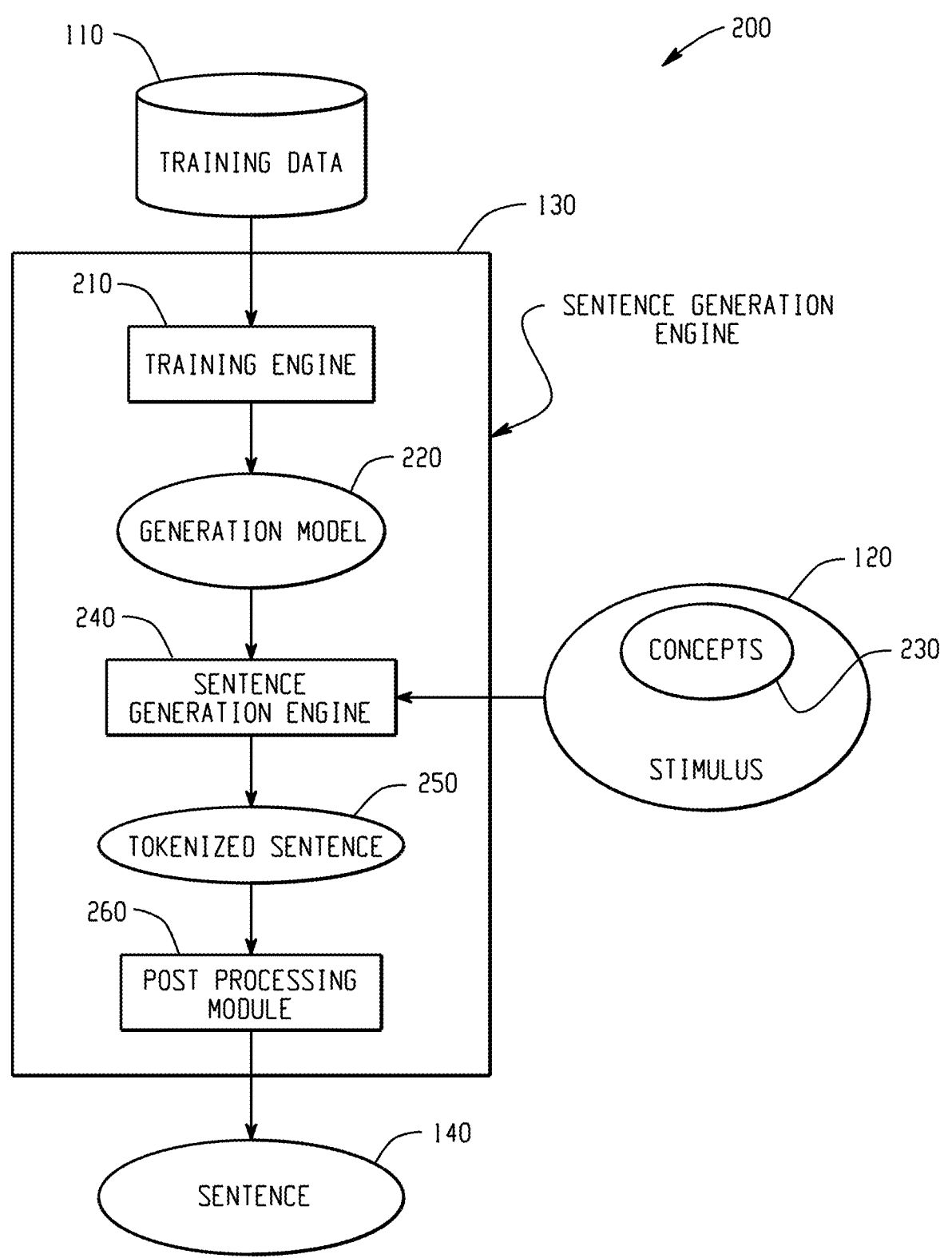
FIG. 2 is a diagram example depicting details of a sentence generation engine.

FIG. 2 depicts a detailed embodiment 200 of the sentence generation engine 130. In this embodiment, a training engine 210 receives the training data 110 to generate a generation model 220. The training engine 210 may utilize machine-learning methods, such as those described in detail in FIG. 6. The generation model 220 may be a machine-learning based language model and may be a transformer with a bidirectional encoder and an autoregressive decoder, in accordance with some embodiments. The generation model 220 may be trained to generate sentences based on input concepts, such that each generated sentence is at least minimally related to the concepts. A sentence generation engine 240 receives the generation model 220 and the stimulus 120. The stimulus 120 may contain concepts 230. Concepts 230 may be one or more concepts that the sentence generation engine 240 may use to generate a sentence based on. Sentence generation engine 240 generates a tokenized sentence 250 based on the stimulus 120. Tokenized sentence 250 may be a set of tokens. Tokenized sentence 250 may relate to any concept 230. Preferably, the tokenized sentence 250 relates to all the concepts 230. Post processing module 260 transforms tokenized sentence 250 into sentence 140 by converting it from a set of tokens into a proper sentence, including correct capitalization and punctuation.

Figure 8:
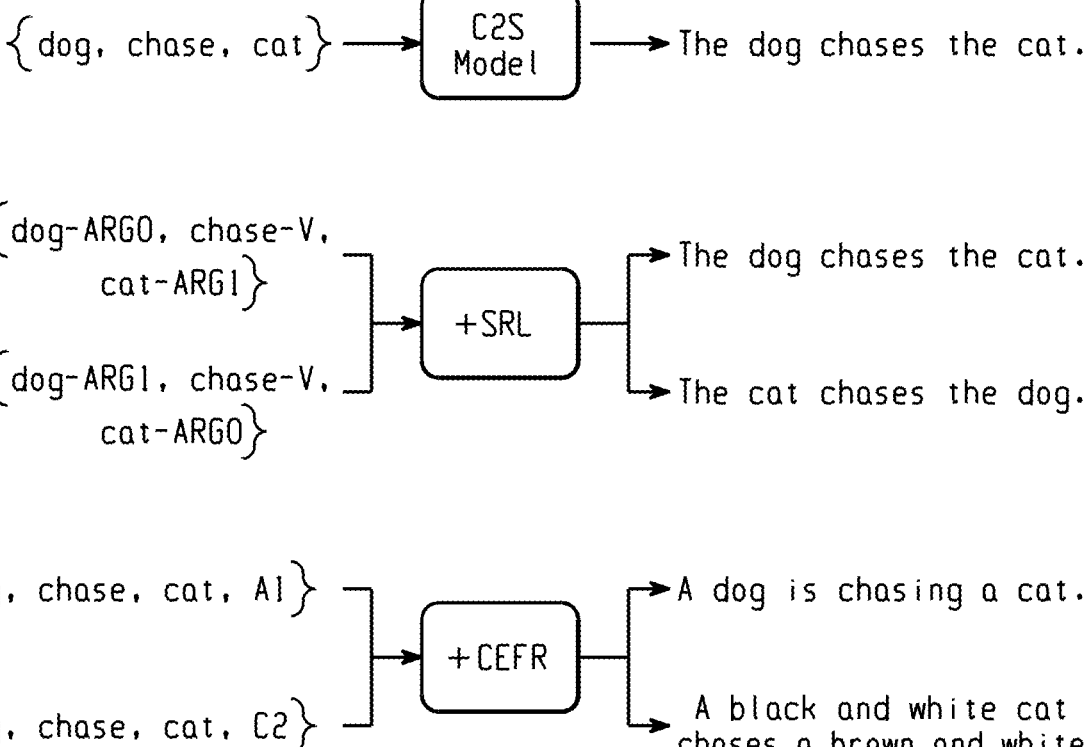
FIG. 8 is figure depicting example scenarios for concept to sequence generation process, using semantic role labels and CEFR levels.

As an example, illustrated in FIG. 8, the sentence generation engine 240 may receive the following concepts 230 as a part of its stimulus 120: dog, chase, cat. In accordance with some embodiments, the sentence generation engine

240, along with the post processing module 260, may generate the following sentence 140: The dog chases the cat.

Figure 3:
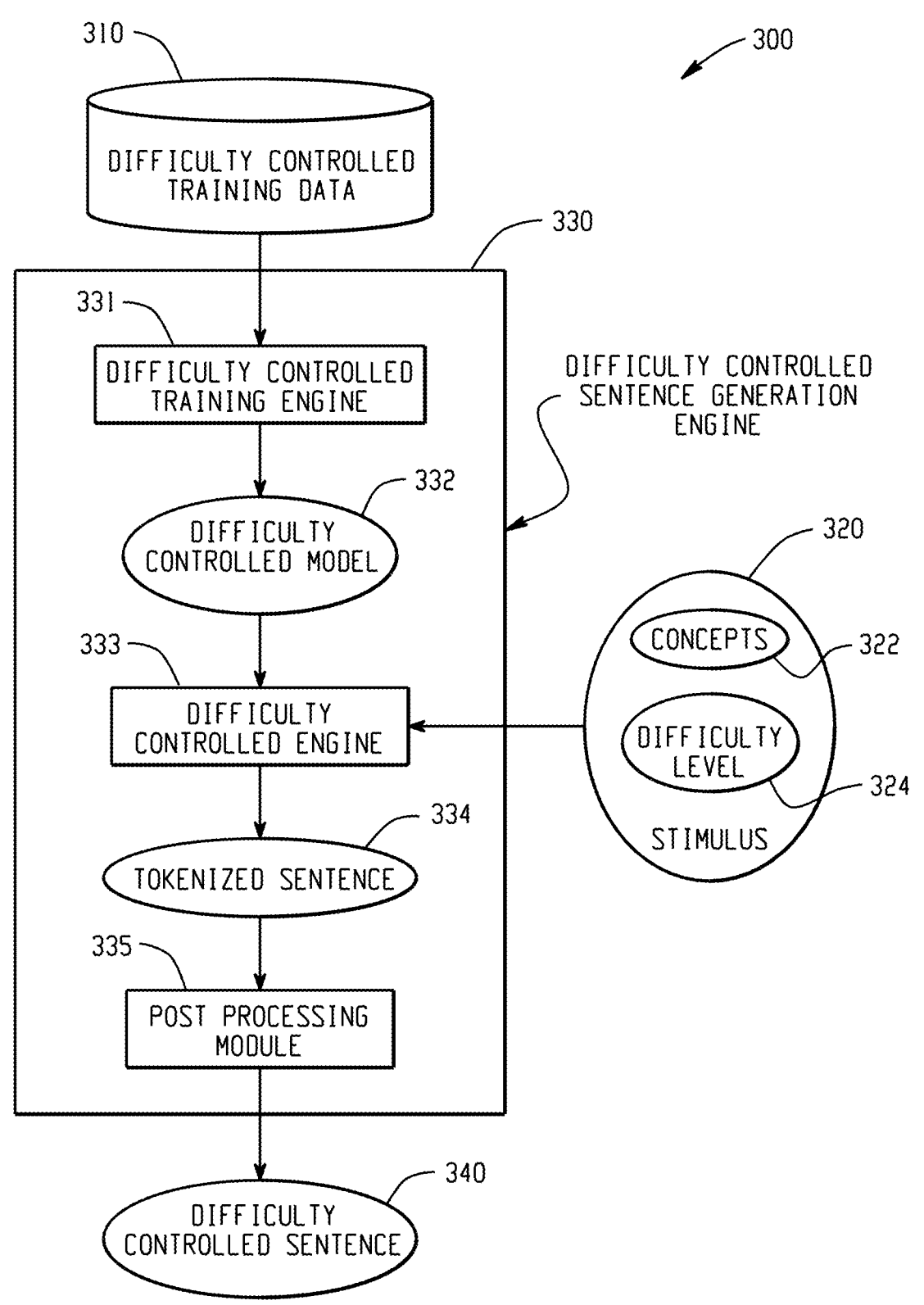
FIG. 3. is a diagram depicting an example system for generating difficulty controlled language learning items.

In some embodiments, sentences may be generated based on difficulty level. This may be desirable in situations where sentences need to be generated based on a user's specific needs and skill sets. FIG. 3 is a diagram depicting an embodiment 300 of a difficulty controlled sentence generation engine 330. Difficulty controlled training engine 331 receives difficulty controlled training data 310. Difficulty controlled training data 310 may contain concept-sentences pairs, which also include a difficulty level. For example, for the English language, Common European Framework of Reference for Languages (CEFR) levels may be used. CEFR is an international standard for measuring user ability within a language. CEFR levels, including A1, A2, B1, B2, C1, and C2, ordered by increasing difficulty level. Other difficulty scales may be used for English or other languages. Difficulty controlled training engine 331 generates difficulty controlled model 332, which may be trained to produce sentences that are at least minimally relate to particular concepts and a CEFR level. Difficulty controlled engine 333 receives difficulty controlled model 332 and stimulus 320 to generate a tokenized sentence 334. Stimulus 320 may contain concepts 322, which may include one or more concepts, and difficulty level 324, which may be a CEFR level. Tokenized sentence 334 may be related to concepts 322 and may be at difficulty level 324. Post processing module 335 converts tokenized sentence 334 into difficulty controlled sentence 340, which may be grammatically correct with proper capitalization and punctuation.

As an example, illustrated by FIG. 8, for a stimulus containing the concepts dog, chase, and cat and CEFR level A1, the difficulty controlled sentence generation engine 330 may generate the difficulty controlled sentence 340 "A dog is chasing a cat." However, if the CEFR level is C2, the difficulty controlled sentence generation engine 330 may generate the difficulty controlled sentence 340 "A black and white cat chases a brown and white dog in the woods."

In other embodiments, sentences may be generated based on semantic roles and argument structure. Non limiting examples of semantic roles and argument structures include agent, patient, verb and modifier. An agent may perform an action and typically is the argument of a verb. A patient may undergo an action or change its state. A verb may indicate a physical action, a mental action or a state of being. A modifier may offer details that make a sentence more engaging, clearer, or specific. Including semantic may be desirable in situations where a language learner may be tested on grammar. Including semantic roles for concepts may allow for a sentence to be constrained by the argument structure and may ensure the semantic viability of generations in which the concepts make more sense in a particular role.

Figure 4:
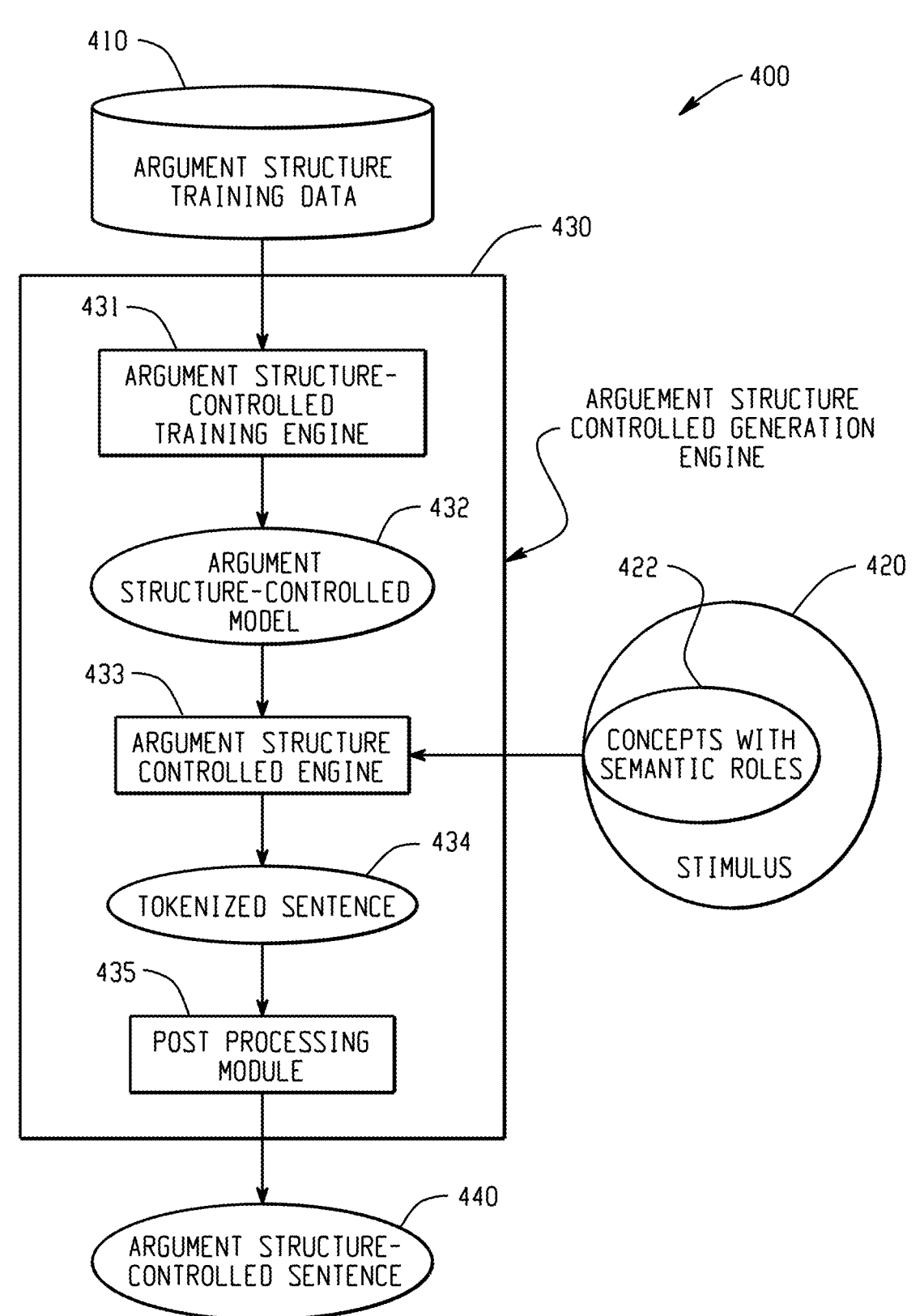
FIG. 4. is a diagram depicting an example system for generating argument structure controlled language learning items FIG. 5. is a diagram depicting an example system for generating difficulty controlled and argument structure controlled language learning items.

FIG. 4 is a diagram depicting detailed embodiment 400 of argument structure controlled generation engine 430. Argument structure controlled training engine 431 receives argument structure training data 410 and generates arguments structure controlled model 432. Argument structure training data includes concept-sentence pairs, where the semantic role of the concept in the sentence is identified and labeled. Argument structure controlled model 432 may generate sentences that are at least minimally related to the concepts and may be in the correct semantic role.

The argument structure controlled engine 433 receives the argument structure controlled model 432 and the stimulus 420 to generate tokenized sentence 434. The stimulus 420 includes concepts with semantic roles 422. Concepts with semantic roles 422 may comprise one or more concepts, and each concept may have a semantic role associated with it. Tokenized sentence 434 may be related to concepts with semantic roles 422. The post processing module 435 converts tokenized sentence 434 into argument structure controlled sentence 440, which may be grammatically correct with proper capitalization and punctuation.

As illustrated in FIG. 8, for a stimulus containing dog with ARG0 (agent), chase with V (verb) and cat with ARG1 (patient), an example embodiment would generate the following sentence: The dog chases the cat. If the example system were given a stimulus containing dog with ARG1, chase with V and cat with ARG0, it may generate the following sentence: The cat chases the dog.

Figure 5:
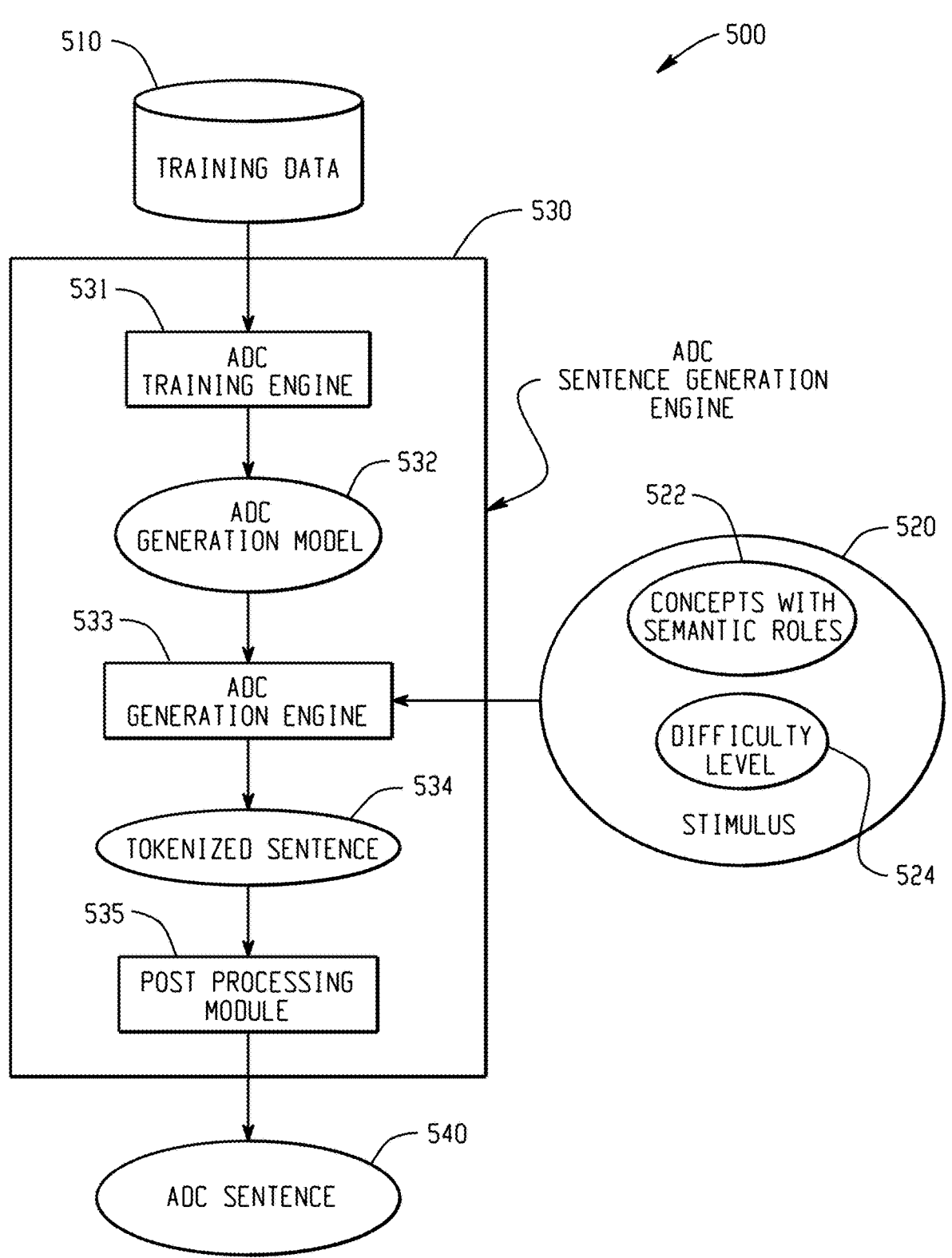

In accordance with some embodiments, the system may generate sentences with both argument structure and level of difficulty controls (ADC). FIG. 5 depicts detailed embodiment 500 of an ADC sentence generation engine 530. ADC training engine receives training data 510 and generates ADC generation model 532. Training data 510 may comprise concept-sentence pairs with a semantic role associated with each concept and a difficulty level associated with each sentence in the pair. ADC Generation Engine 533 receives stimulus 520 and generates tokenized sentence 534. Stimulus 520 may include concepts with semantic roles 522 and difficulty level 524. Concepts with semantic roles 522 may include one or more concepts and may identify the desired semantic role or argument structure for each concept. The difficulty level 524 may indicate the desired difficulty level for the sentence generated. Tokenized sentence 534 may comprise a sentence that is at least minimally related to the concepts with semantic roles 522 and the difficulty level 524. The post processing module 535 converts the tokenized sentence 534 into ADC sentence 540, which may be grammatically correct with proper capitalization and punctuation.

Figure 6:
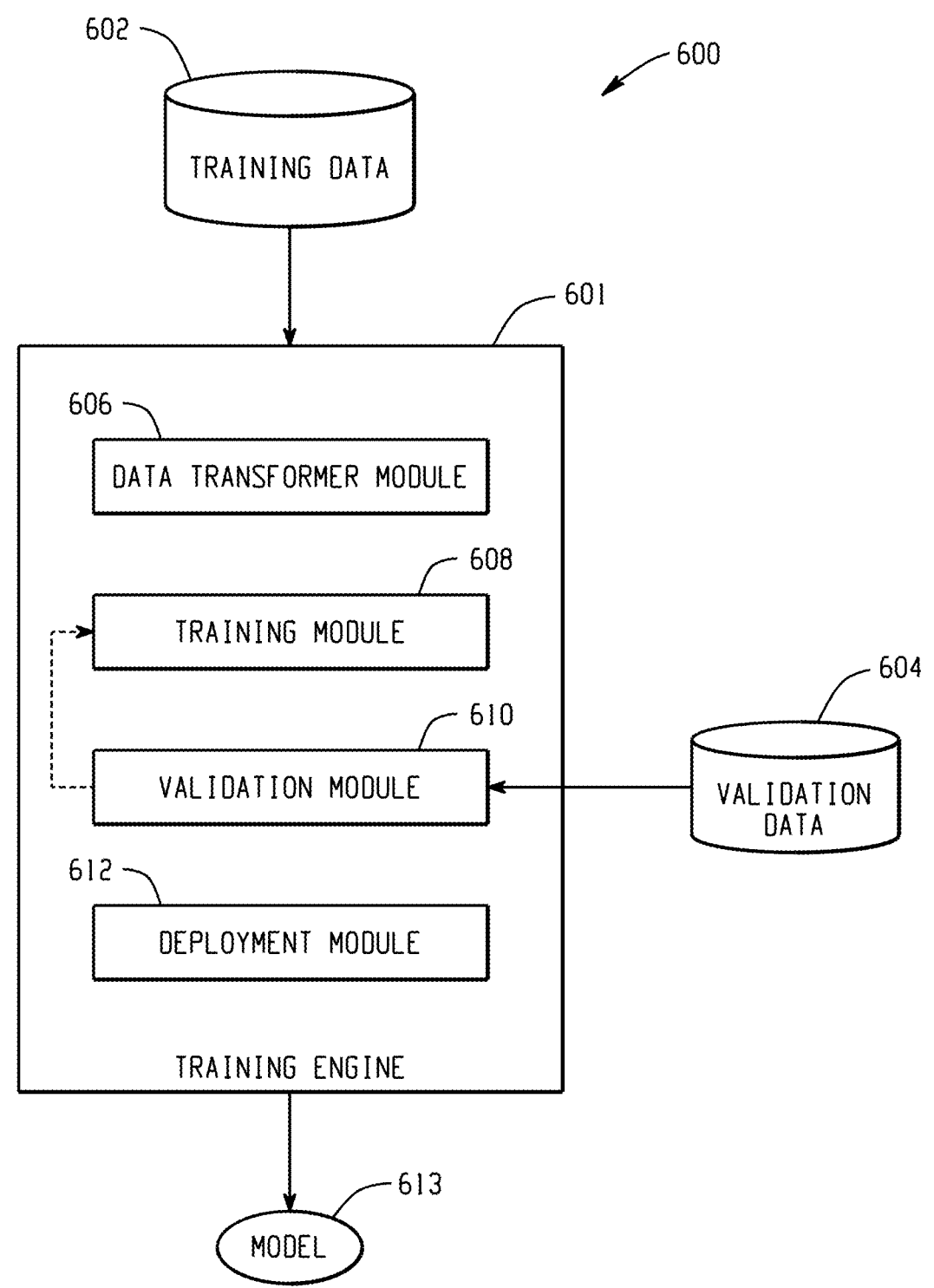
FIG. 6. is a diagram example depicting details of a training engine.

FIG. 6. is an example embodiment, illustrating the training process performed by training engine 601. The training process described for training engine 601 may be similar to the training process of training engine 210, difficulty controlled training engine 331, argument structure-controlled training engine, and ADC training engine 531. Training engine 601 includes a data transformer module 606, which prepares training data 602. Training data 602 may be any training data and may be similar to the training data described in previous embodiments. The data transformer module 606 may randomize the data and clean the data. A training module 608 may receive the prepared data from the data transformer module 606 and hyperparameters, and it builds a model that generates sentences based on stimulus. Hyperparameters may be parameters that help control the learning process of a model and determine the values of model parameters that a learning algorithm may end up learning. Hyperparameters may be manually set and the validation module 610 may help the engine evaluate them to ensure that the trained model parameters are effectively determined. Hyperparameters may include the number of training steps, learning rate, and initialization values and distributions.

The training module 608 may use a machine-learning based language model that contains a bidirectional encoder and an autoregressive decoder. One example of a machine-learning based language model is a Bayesian additive regressive tress (BART) model. A validation module 610 receives the trained model and validation data 604. Validation data 604 may contain similar data in a similar format as training data 602. The validation module 610 may use the validation data 604 to test the trained model and reset hyperparameters if it determines it would help make the trained model more effective. If the hyperparameters are reset, the model will run through the training module 612 again. A deployment module 612 receives the trained model from the validation module 610 and generates model 613. Model 613 may be any model, including a model that generates sentences based on stimulus.

Figure 7:
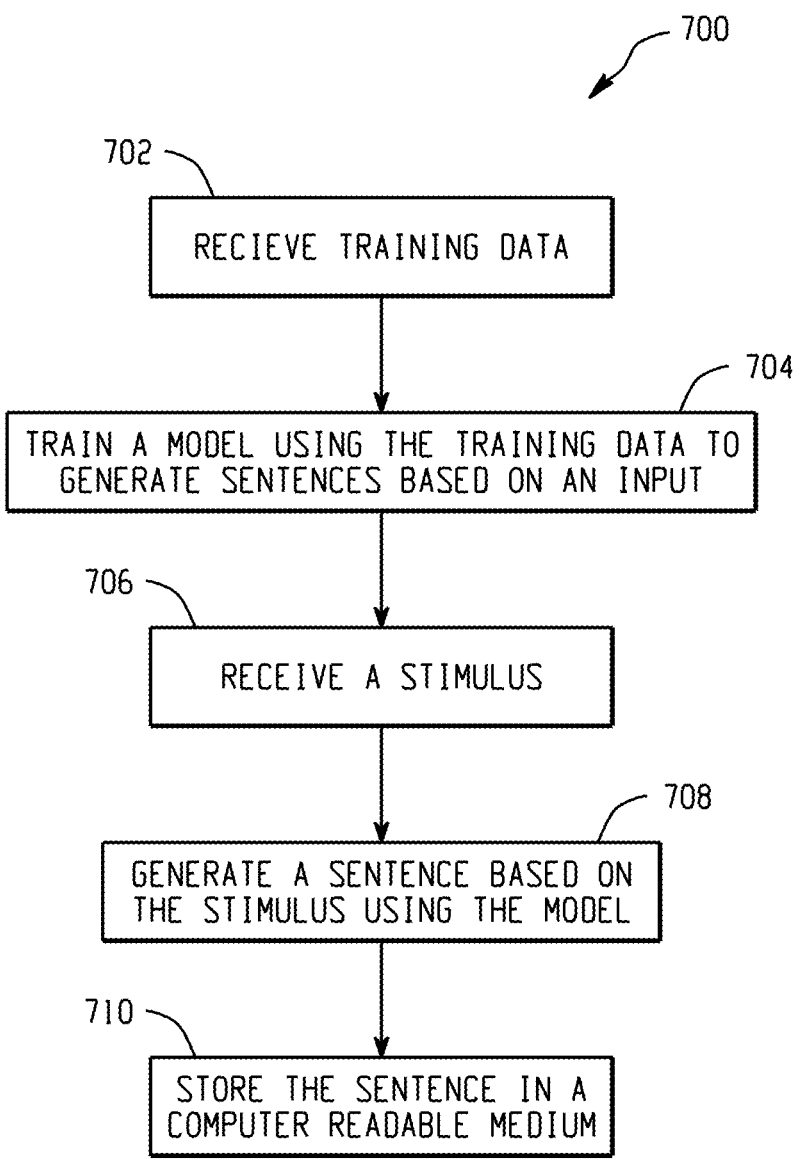
FIG. 7 is a flow diagram depicting an example method for generating language learning item.

FIG. 7 is a flow diagram depicting an example method of generating language learning items. At 702, a system receives training data. At 704, the system trains machine-learning based model, using the training data, to generate sentences based on an input. At 706, the system receives a stimulus. At 708, the system generates a sentence based on the stimulus using the trained model. At 710, the system stores the sentence in a computer readable medium.

Figure 9:
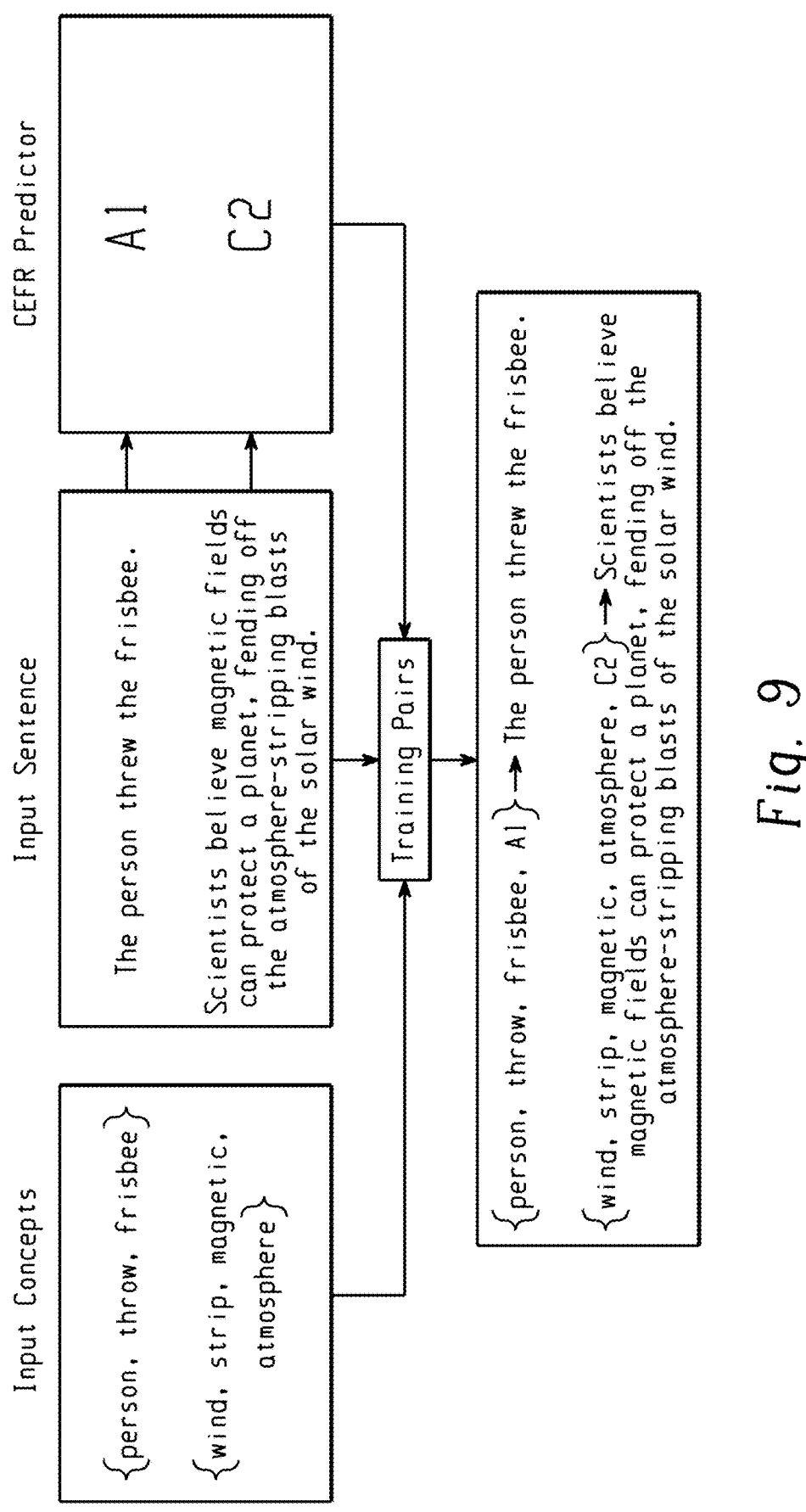
FIG. 9 is a diagram depicting an example method for applying CEFR levels to input concepts using a CEFR scorer.
Figure 10:
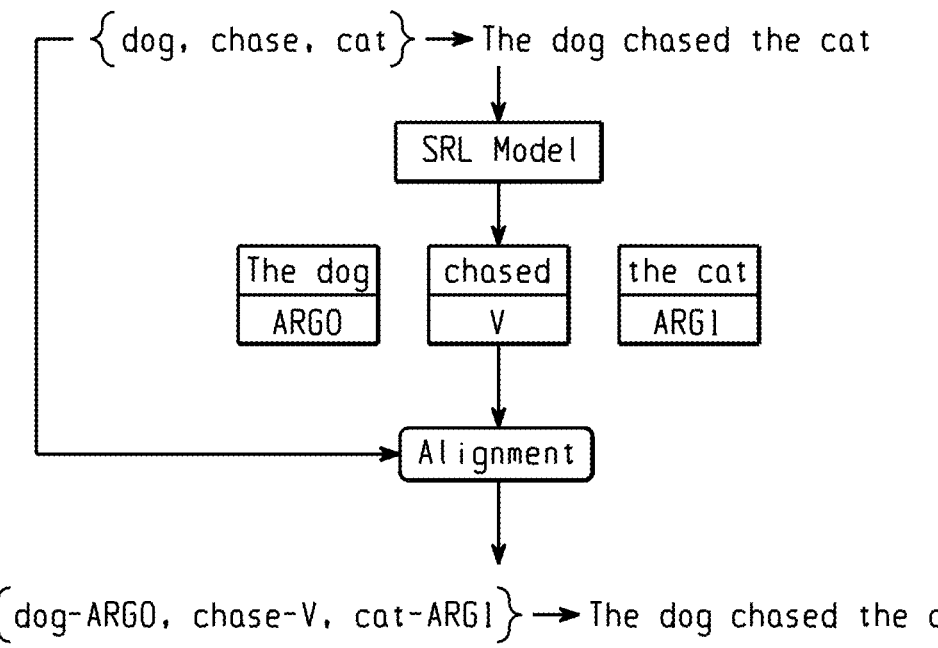
FIG. 10 is a diagram depicting an example method for applying SRL parse to original concepts.

FIG. 8 illustrates examples of sentences that may be generated by the different embodiments as described above. FIG. 9 depicts a detailed example of training data that may be utilized in embodiment 300, where the sentences are controlled by difficulty level as well as examples of types of sentences a trained model may generate. FIG. 10 depicts a detailed example of training data that may be utilized in embodiment 400, where the sentences are controlled by argument structures as well as examples of types of sentences a trained model may generate.

FIG. 11 depicts automatic evaluation of 5 example models: (1) a baseline model (BASE), similar to FIG. 2, which generates a sentence using a list of concepts, (2) an argument structure controlled model (SRL), which includes the argument structure of the generated sentences as a control code, (3) a difficulty controlled model, (CEFR(A1)) which specified that the difficulty should be A1, (4) a difficulty controlled model (CEFR(A2)), which specified that the difficulty should be C2, and (5) a model pretrained from scratch using 10 million random concept-sentence pairs on top of the pretrained BASE model (WIKI). FIG. 11 measures perplexity, an indicator of the fluency of the text, coverage, an indicator of whether the generated sentences contain the input concepts (both the percentage of generations that contain any of the concepts as well as all of the concepts were evaluated), the average length of the generated (in number of words) and the diversity of the average Tf-idf score of all non-stopwords in the sentence. A lower score indicates better perplexity and higher diversity.

FIG. 12 depicts a table comparing the SRL model to the BASE model to evaluate the accuracy of whether the SRL-based inputs are represented in the outputs for four most frequent argument types (ARG0, ARG1, ARGM, V). FIG. 13 depicts a table of three criteria for human evaluation. The criteria evaluates are grammaticality, complexity and plausibility. Each was scored from 0 to 3, where 0 means the lowest and 3 means the highest score. These were scored by human evaluators on a crowdsourcing platform.

The methods and systems described herein may be implemented using any suitable processing system with any suitable combination of hardware, software, and/or firmware, such as described below with reference to the non-limiting examples of FIGS. 14*a*, 14*b*, and 14*c*.

Figure 14A:
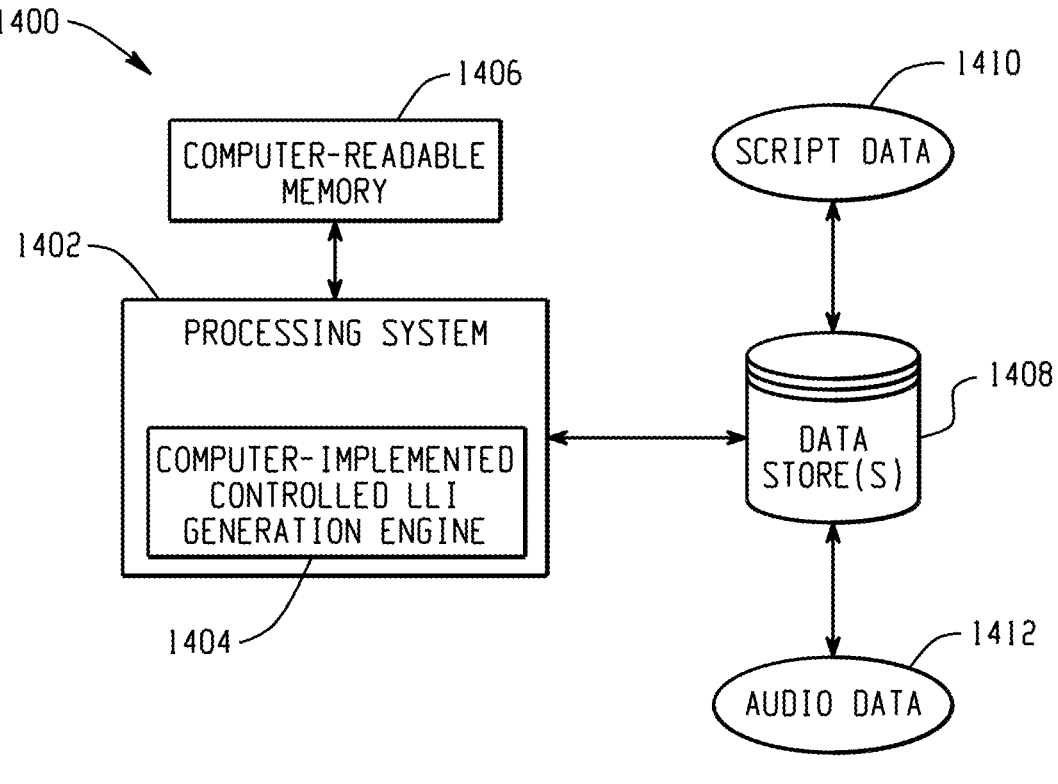
FIG. 14*a*, FIG. 14*b*, and FIG. 14*c* are flow diagrams depicting example systems for implementing the approaches described herein for detecting language learners' phonemic mispronunciation tendencies.
Figure 14B:
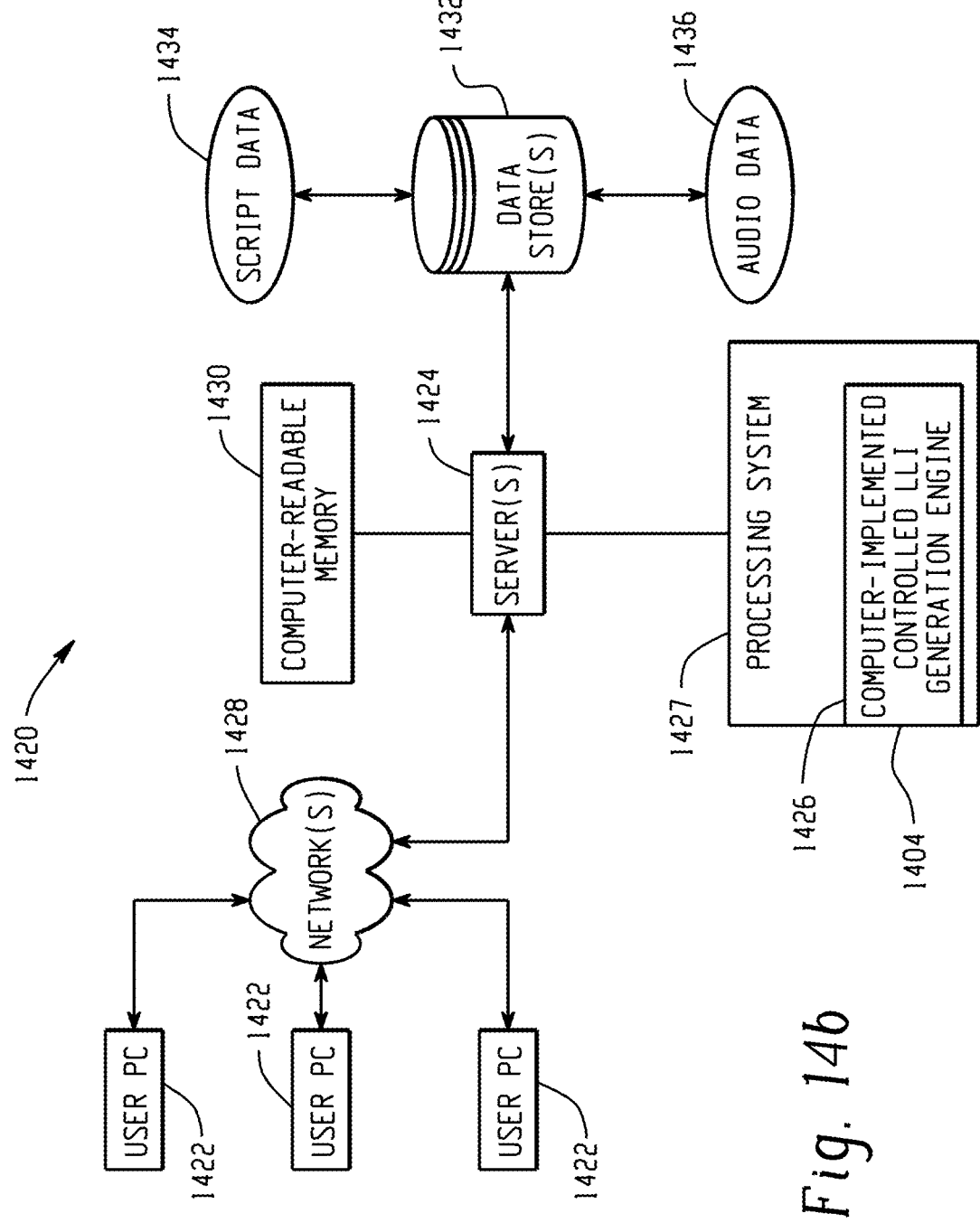
Figure 14C:
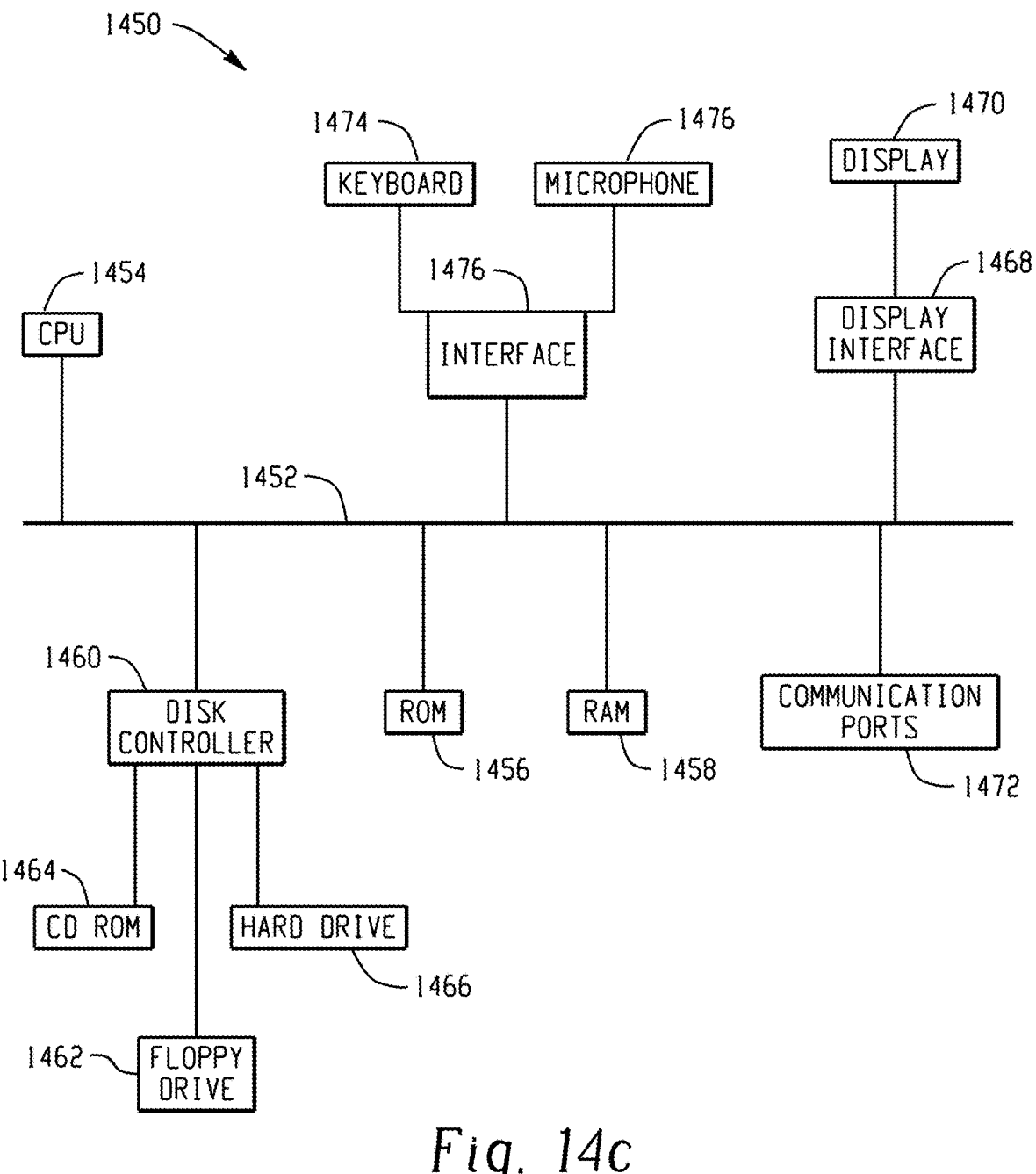

FIGS. 14*a*, 14*b*, and 14*c* depict example systems for use in implementing a system. For example, FIG. 14*a* depicts an exemplar system 1400 that includes a standalone computer architecture where a processing system 1402 (e.g., one or more computer processors) includes a computer-implemented phoneme mispronunciation analyzer engine 1404 being executed on it. The processing system 1402 has access to a non-transitory computer-readable memory 1406 in addition to one or more data stores 1408. The one or more data stores 1408 may contain script data 1410 as well as audio data 1412.

FIG. 14*b* depicts a system 1420 that includes a client server architecture. One or more user PCs 1422 accesses one or more servers 1424 running a system 1426 on a processing system 1427 via one or more networks 1428. The one or more servers 1424 may access a non-transitory computer readable memory 730 as well as one or more data stores 1432. The one or more data stores 1432 may contain script data 1434 as well as audio data 1436.

FIG. 14*c* shows a block diagram of exemplary hardware for a standalone computer architecture 1450, such as the architecture depicted in FIG. 14*a*, that may be used to contain and/or implement the program instructions of system embodiments of the systems and methods herein. A bus 1452 may serve as the information highway interconnecting the other illustrated components of the hardware. A processing system 1454 labeled CPU (central processing unit) (e.g., one or more computer processors) may perform calculations and logic operations required to execute a program. A non-transitory computer-readable storage medium, such as read-only memory (ROM) 1456 and random access memory (RAM) 1458, may be in communication with the processing system 1454 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal or a modulated carrier wave, e.g., such that the instructions may then be stored on a non-transitory computer-readable storage medium.

A disk controller 1460 interfaces one or more optional disk drives to the system bus 1452. These disk drives may be external or internal floppy drives such as 1462, external or internal CD-ROM, CD-R, CD-RW or DVD drives such as 1464, or external or internal hard drives 1466. As indicated previously, these various disk drives and disk controllers are optional devices.

Each of the element managers, real time data buffer, conveyors, file input processor, database index shared access memory loader, reference data buffer and data managers may include a software application stored in one or more of the disk drives connected to the disk controller 1460, the ROM 1456 and/or the RAM 1458. Preferably, the process 1454 may access each component as required.

A display interface 1468 may permit information from the bus 1456 to be displayed on a display 1470 in audio, graphic, or alphanumeric format. Communication with external devices may optionally occur using various communication ports 1472.

In addition to the standard computer-type components, the hardware may also include data input devices, such as a keyboard 1474 or other input device 1476, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A computer-implemented method of generating language learning items comprising:

receiving, at a training engine, training data comprising a plurality of concept-sentence pairs from a sentence database;

training, by a training module, a machine-learning based language model, using the training data, to generate sentences based on an input;

evaluating, by a validation module, the trained machine-learning based language model, wherein evaluating comprises:

receiving validation data comprising a plurality of concept-sentence pairs;

calculating frequency counts of each concept in the validation data;

testing the trained machine-learning based language model's ability to generate sentences from a chosen number of high frequency concepts and a chosen number of low frequency concepts based on one or more measured standards, comprising: sentence perplexity, concept coverage, sentence length, or lexical diversity; and retraining, by the training module, the trained machine-learning based language model if the trained machine-learning based language model does not meet a baseline value for the one or more measured standards;

receiving, at a sentence generation engine, a stimulus;

generating, by the sentence generation engine using the trained machine-learning based language model, a sentence based on the stimulus; and storing the sentence in a computer readable medium.

2. The method of claim 1, wherein the stimulus comprises at least one concept.

3. The method of claim 2, wherein each concept-sentence pair comprises a training concept and a training sentence based on the training concept.

4. The method of claim 3, wherein each concept-sentence pair further comprises a training level of difficulty and wherein the stimulus further comprises a level of difficulty.

5. The method of claim 3, wherein each concept-sentence pair further comprises a training semantic role and wherein the stimulus further comprises a semantic role for each concept.

6. The method of claim 5, wherein the semantic roles comprise an agent, a patient, a verb, or a modifier.

7. The method of claim 1, wherein the trained machine-learning based language model is a transformer comprising a bidirectional encoder and an autoregressive decoder.

8. A system for generating language learning items comprising:

a processing system comprising one or more data processors; and a computer-readable medium encoded with instructions for commanding the processing system to execute steps comprising:

receiving, at a training engine, training data comprising a plurality of concept-sentence pairs from a sentence database;

training, by a training module, a machine-learning based language model, using the training data, to generate sentences based on an input;

evaluating, by a validation module, the trained machine-learning based language model, wherein evaluating comprises:

receiving validation data comprising a plurality of concept-sentence pairs;

calculating frequency counts of each concept in the validation data;

testing the trained machine-learning based language model's ability to generate sentences from a chosen number of high frequency concepts and a chosen number of low frequency concepts based on one or more measured standards, comprising: sentence perplexity, concept coverage, sentence length, or lexical diversity; and retraining, by the training module, the trained machine-learning based language model if the trained machine-learning based language model does not meet a baseline value for the one or more measured standards;

receiving, at a sentence generation engine, a stimulus;

generating, by the sentence generation engine using the trained machine-learning based language model, a sentence based on the stimulus; and storing the sentence in a computer readable medium.

9. The system of claim 8, wherein the stimulus comprises at least one concept.

10. The system of claim 9, wherein each concept-sentence pair comprises a training concept and a training sentence based on the training concept.

11. The system of claim 10, wherein each concept-sentence pair further comprises a training level of difficulty and wherein the stimulus further comprises a level of difficulty.

12. The system of claim 10, wherein each concept-sentence pair further comprises a training semantic role and wherein the stimulus further comprises a semantic role for each concept.

13. The system of claim 12, wherein the semantic roles comprise an agent, a patient, a verb, or a modifier.

14. The system of claim 8, wherein the trained machine-learning based language model is a transformer comprising a bidirectional encoder and an autoregressive decoder.

15. A non-transitory computer-readable medium encoded with instructions for commanding one or more data processors to execute steps of a method for generating language learning items comprising:

receiving, at a training engine, training data comprising a plurality of concept-sentence pairs from a sentence database;

training, by a training module, a machine-learning based language model, using the training data, to generate sentences based on an input;

evaluating, by a validation module, the trained machine-learning based language model, wherein evaluating comprises:

receiving validation data comprising a plurality of concept-sentence pairs;

calculating frequency counts of each concept in the validation data;

testing the trained machine-learning based language model's ability to generate sentences from a chosen number of high frequency concepts and a chosen number of low frequency concepts based on one or more measured standards, comprising: sentence perplexity, concept coverage, sentence length, or lexical diversity; and retraining, by the training module, the trained machine-learning based language model if the trained machine-learning based language model does not meet a baseline value for the one or more measured standards;

receiving, at a sentence generation engine, a stimulus;

generating, by the sentence generation engine using the trained machine-learning based language model, a sentence based on the stimulus; and storing the sentence in a computer readable medium.

16. The non-transitory computer-readable medium of claim 15, wherein the stimulus comprises at least one concept.

17. The non-transitory computer-readable medium of claim 16, wherein each concept-sentence pair comprises a training concept and a training sentence based on the training concept.

18. The non-transitory computer-readable medium of claim 17, wherein the trained machine-learning based language model is a transformer comprising a bidirectional encoder and an autoregressive decoder.

\* \* \* \* \*